United States Patent [19]

Moy et al.

[11] Patent Number: 4,693,509
[45] Date of Patent: Sep. 15, 1987

[54] CONVERTIBLE TOP

[75] Inventors: Howard Moy, Rochester; James R. Thomas, Sterling Heights; Donald J. Droske, Mt. Clemens, all of Mich.

[73] Assignee: General Motors Corporation, Detroit, Mich.

[21] Appl. No.: 845,260

[22] Filed: Mar. 28, 1986

[51] Int. Cl.⁴ .............................. B60J 1/18; B60J 7/12
[52] U.S. Cl. .................... 296/201; 296/146; 296/107
[58] Field of Search ............... 296/107, 109, 116, 117, 296/145, 146, 201

[56] References Cited

U.S. PATENT DOCUMENTS

| | | | |
|---|---|---|---|
| 1,981,060 | 11/1934 | Miller | 296/116 |
| 2,711,924 | 6/1955 | Orr | 296/107 |
| 2,747,928 | 5/1956 | Olivier et al. | 296/107 |
| 3,188,135 | 6/1965 | Bernstein et al. | 296/117 |
| 3,236,557 | 2/1966 | Podolan | 296/145 |
| 3,332,169 | 7/1967 | Lohr et al. | 296/146 X |
| 3,333,362 | 8/1967 | Kostin et al. | 296/146 X |
| 3,346,297 | 10/1967 | Colautti et al. | 296/146 |
| 3,385,629 | 5/1968 | Podolan | 296/146 |

FOREIGN PATENT DOCUMENTS 501252 11/1954 Italy ...................................... 296/107

Primary Examiner—Robert B. Reeves
Assistant Examiner—Dennis H. Pedder
Attorney, Agent, or Firm—Ernest E. Helms

[57] ABSTRACT

The present invention provides a convertible top and support arrangement for the rear window. The present invention provides a convertible top with a top cover overlay type seal between the glass and cover. In the present invention's preferred embodiment, the window is cantileveredly supported at its rearward end. At its forward end the window is supported via a linkage with a cabled tension stabilizer. The arrangement provides increased stabilizing force with minimum tension in the cable or in the cantilevered support mechanism.

18 Claims, 6 Drawing Figures

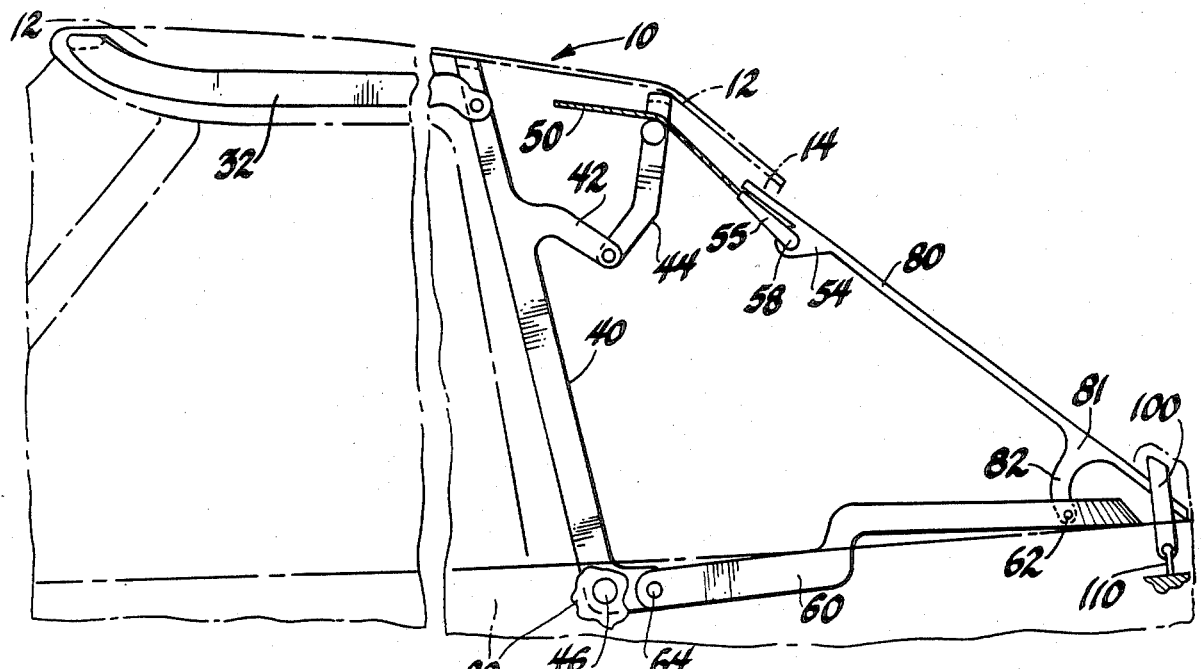

CONVERTIBLE TOP

FIELD OF THE INVENTION

The field of the present invention is that of automobile convertible tops. More particularly the present invention relates to convertible tops having a hard glass back window. Still more particularly the present invention relates to a convertible top having a hard back window wherein the mating of the glass and cover simply comprises an overlay of the cover over the glass.

DISCLOSURE STATEMENT

Prior to the present invention most convertible tops utilized a flexible back window which was usually made from a plastic compound. The flexible window provided a convertible top linkage system which was compact when in a storage position since the window was allowed to bend.

The use of flexible materials in the back window is undesirable due to the low scratch resistance of such materials and also because of their tendencies of age discoloration and/or cracking after prolonged exposure to the environment. To overcome the above noted problem there has been developed various convertible tops utilizing hard glass. The use of hard glass in convertible tops presents a problem in that the glass must be handled carefully to prevent breakage. Also the glass window sometimes requires a protective cover to protect the glass from being scratched in the stored position.

Another problem of conventional glass convertible tops is the volume of storage required for the linkage mechanism when the top is down. The required storage space is not of great concern in large automobiles having powered convertible tops. However in smaller automobiles such as roadsters, prior hard glass convertible tops take up a large amount of the space which would be better utilized for luggage space in the trunk area.

To allow the use of hard glass in roadster type vehicles a novel linkage system was developed which allowed storage of the glass window in a more compact area. However, the above novel linkage system required that the glass be able to break away from the cover (when folding down the convertible top) and not be sewn into the cover as in conventional convertible tops which have nonflexible rear windows.

The newly developed convertible top has an overlay of the top cover over the glass as the mating surface. Since the glass is not sewn into the cover it is cantileveredly held in an upward position by pulling downward on its lower rearward end. To stabilize the glass during vehicle operation from vibrations a tension cable or strap is added to the forward end which interacts with the rear bow (rearward linkage) of the convertible top.

To insure the proper sealing between the glass and the cover the glass must be urged upward against the top cover. And as mentioned previously, to stabilize the glass it must be pulled in tension. To increase the stabilization of the glass and to provide optimum mating between the glass and the top cover the tension cable should be pulled as tightly as possible. However increasing the tension placed on the glass frame to reach the desired state of stabilization of the rear window often causes excessive forces in the cable and in the pull down force of the glass. It is desired to find a method in which the forces of stabilization on the window may be maximized while at the same time however keeping the stress of the tension cable and the pull down force at a minimum.

SUMMARY OF THE INVENTION

To overcome the above noted problems the present invention is brought forth. The present invention in a preferred embodiment provides a convertible top with a break away nonflexible back window having a forward linkage for supporting the front portion of the cover, a rear bow with extension for supporting a rearward portion of the cover, a trim stick pivotally connected with the rear bow being also pivotally connected with the glass, a pull down mechanism to cantileveredly urge the glass away from the trim stick, and an upper window link and a support link wherein the support link is operationally connected by a flexible cable with the rear bow and wherein window has a point of contact with the support link.

By use of the inventive convertible top, the stabilizing force urging the glass to maintain its mated position with the vehicle cover may be increased while minimizing the forces experienced in the tension cable, or in the pull down mechanism which cantileveredly supports the vehicle glass.

It is an object of the present invention to provide a back window support arrangement for a convertible top wherein the back window has a rigid frame cantileveredly supported at its rearward end and having an upper window link pivotally connected at its upper end, a support link pivotally connected with said upper window link, said support link being connected by a flexible tensioning means with another part of said convertible top and wherein said support link has a point of contact with said glass frame. It is also an object of the present invention to cantileveredly support a back glass in the convertible top while at the same time minimizing the stablizing force needed in the cable attached to the forward end of the glass.

It is a desire of the present invention to provide a convertible top as heretofore described also including biased upper window links and connecting support links on both sides of the rear window.

Other objects, desires and advantages of the present invention will become more apparent to those skilled in the art as the nature of the invention is better understood from the accompanying drawings and a detailed description.

BRIEF DESCRIPTION OF THE DRAWINGS

FIG. 1 is a side elevational view of a vehicle top prior to the present invention with a nonflexible rear window.

FIG. 2 is a side elevational view of a convertible top of the present invention in a raised position with the front portion of the convertible top removed for clarity of illustration.

FIG. 3 is a perspective view of a convertible top of the present invention installed within a vehicle.

FIG. 6 is a view taken along line 6—6 of FIG. 2.

DETAILED DESCRIPTION OF THE DRAWINGS

Figure 4:
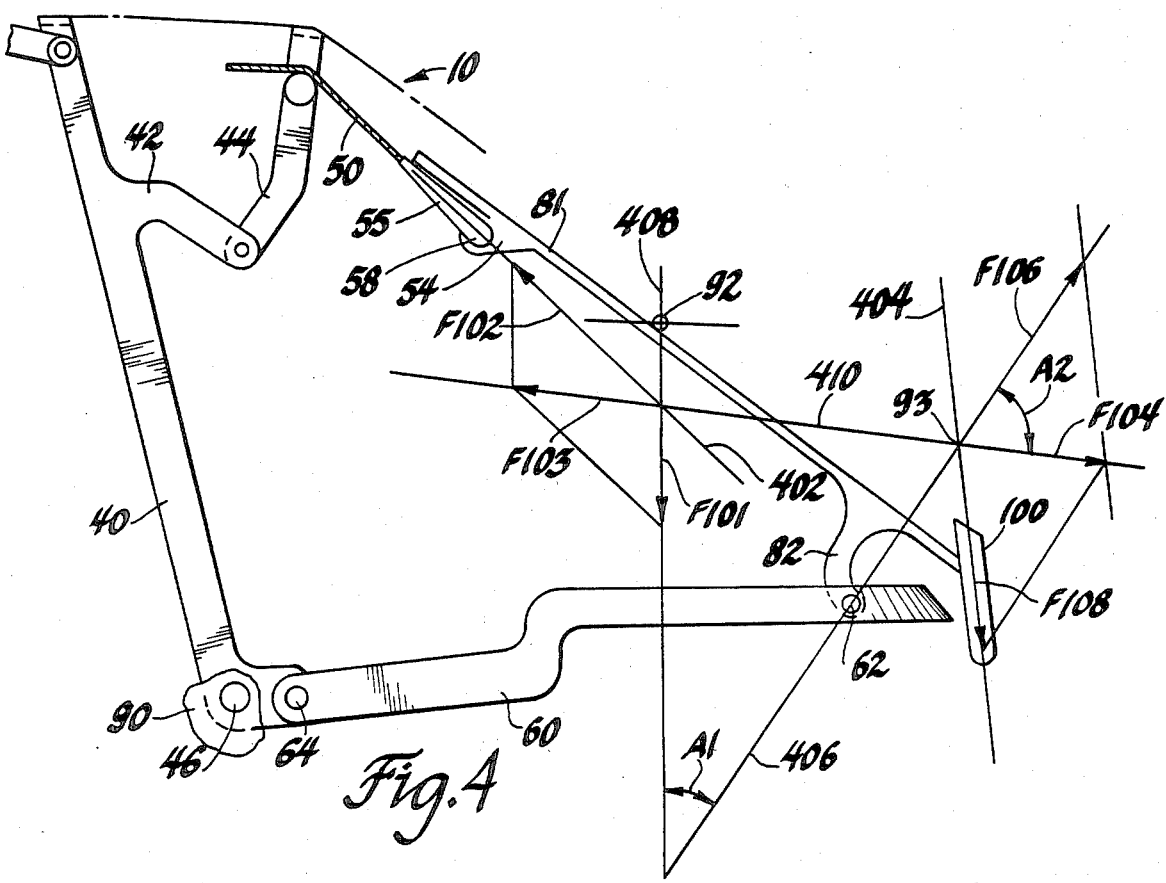
FIG. 4 is a partial side view illustrating the vectorial forces of the convertible top illustrated in FIG. 1.

FIG. 1 is a side elevational view of a typical vehicle top utilizing a nonflexible typically glass back window. The vehicle top 10 has a cover 12 which covers the convertible top and overlaps the back window 80. A forward linkage 32 is provided for supporting a forward portion of the convertible top cover 12.

Rearward of the forward portion of the convertible top is the back bow 40 which projects generally upward in the raised position to support a rearward portion of the cover 12. The back bow is transversely pivotally attached to the vehicle 90 along pivot points 46 (for clarity of illustration, only one side of the convertible top linkage is illustrated). Rearward of the back bow is a back bow extension 44 which is pivotally connected to an arm 42 of the back bow. The back bow extension 44 supports a portion of the cover 12 which is rearward of the back bow 40.

Pivotally attached to the vehicle via the back bow along the back bow's end adjacent to the motor vehicle body is a crescent shaped trim stick 60 pivotally attached transversely at its opposite ends at point 64 to the back bow.

The vehicle rear back window frame 81 has means of pivotal attachment to the body 90 (opposite the end of the trim stick 60 adjacent to the back bow 40) at point 62 via a fixably attached arm extension 82 to the trim stick 60. The window 80 is angularly urged away from trim stick 60 and is cantileveredly supported by hold down means striker bar 100 which is held by pin 110 which is urged downward by a pull down mechanism contained within the body 90. The above cantilevered arrangement supports the window and the window is urged to mate with cover 12 in an area approximated by item 14.

To stabilize the window 80 from vibrational forces, the window 80 is held in tension by a flexible tension means 50 which is operationally connected with the back bow 40 or its extension 44. The flexible tension means (cable) 50, independent of striker bar 100 is attached with the back window frame 81 via an extension 54 having a pivotally mounted pin 55 of cable 50 which is pivotally attached at point 58. By increasing the tension of the cable 50, the forces of stabilization of the window frame 81 will be increased.

Figure 5:
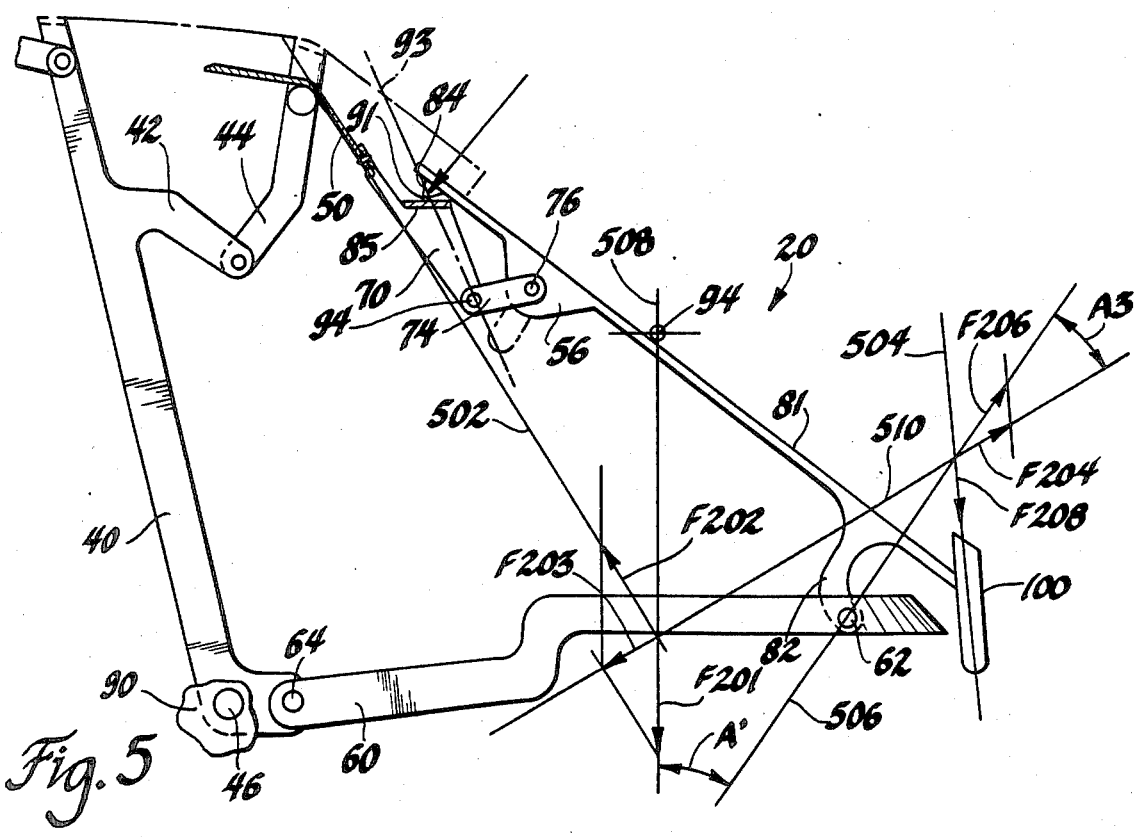
FIG. 5 is a partial side view illustrating the vectorial forces of the vehicle top illustrated in FIG. 2.

Referring to FIGS. 2 and 5, the convertible top of the present invention 20 also provides an upper window link 74 which is pivotally attached with the glass frame extension 56 along point 76 opposite the pivotal attachment of window frame 81 with the trim stick 60. For reasons which shall be described later, the upper window link is angularly spring biased by spring 96 toward trim stick 60 to assume the position shown in phantom. Pivotally connected with the upper window 74 opposite the pivotal attachment of the upper window link 74 with the back window frame 81 is the support link 70. The support link is in turn connected with the cable 50 and is operationally connected with the back bow 40 or its extension 44 as previously described for the convertible top illustrated in FIG. 1. The support link 70 also has a horizontal surface 85 in contact, with a horizontal projection 84 of the vehicle glass frame. Most if not all of window frame 81 and point 76 will be on the same side of a line 93 intersecting the portion 91 of the surface 85 in contact with the window and the pivotal attachment 94 of the support link 70 with the window link 74 (FIG. 5).

As will be readily evident to those skilled in the art, it will be usually preferable to provide upper window links and support links on both side edges of the window frame 81. During the folding operation of the convertible top, the flat horizontal surface 85 of upper window link 70 must pass rearwardly of projection 84 of the back window frame. To allow the support links 70 to pass rearwardly, the upper link 74 by spring biasing will pivot counterclockwise as illustrated (in phantom), therefore, bringing the support links 70 underneath the window frame projection 84. The support links 70 can then pass rearwardly during the remainder of the folding operation of the convertible top.

Referring to FIGS. 4 and 5, the tops 10 and 20 are at equilibrium. Equal downward destabilizing forces (represented by F101 and F201) are imparted to each respective top acting through a vertical line passing through center of gravities 92 and 94 respectively.

In top 10 the vectorial forces in cable 50 act along line 402 and are represented by F102. The force pull down mechanism acts along striker 100, or line 404. Since top 10 is in equilibrim, resultant force F103 (developed from the resolved vectors F102 and F101) is counterbalanced by equal and opposite force F104.

A basic assumption for tops 10 and 20 is made that the force acting at pivot point 62 acts along lines 406 and 506 (which are angle A1 from the vertical lines 408 and 508 respectively) Note: The exactness of angle A1 for this analysis is not critical.

The intersection of line 406 with line 410 provides angle A2, which in turn allows forces F106 and F108 to be resolved (from force F104). From the above analysis, the imposition of destabilizing force F101 will require additional tension forces F102 in cable 50, and tension force F108 in the pull down mechanism to maintain equilibrium.

Convertible top 20 of the present invention has an in position of a vertical destablizing force F201 equal to that of force F101. The force in cable 50 (represented by force 202) acts along line 502. Resolution of forces F201 and F202 provides force F203. Force F203 is equal and opposite to force F204. The line 506 projects along the same angle A1 as in the analysis for top 10. The line 504 through striker 100 is substantially the same as line 404. Therefore force F204 and angle A3 (provided by lines 510 and 506) provide resolution of forces F206 and F208.

For the same vertical destablization force F201 (or F101), the convertible top 20 has an induced tension force in cable 50 and striker 100 which drastically reduced from the forces induced in top 10 in like circumstances.

Therefore the stabilization characteristics of the window can be increased while at the same time minimizing forces induced in the cable or in the pull down mechanism via the striker.

While a few of the embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. An arrangement for supporting a convertible top nonflexible back window in a raised position in a vehicle body comprising in combination:
   means for pivotally attaching said window to said body;
   means for angularly biasing said window away from said body;
   an upper window link pivotally attached to said window opposite said body;
   a support link pivotally attached to said upper window link, said support link also having a surface in contact with said window whereby most of said window and said pivotal attachment of said window with said upper window link are on the same side of a line intersecting said surface of said support link in contact with said window and said pivotal attachment of said support link with said upper window link; and
   tensioning means independent of said angular biasing means operatively connecting said support link with a portion of said vehicle top forward of said window.

2. An arrangement as recited in claim 1 further comprising pull down means for pulling down said window rearward of the point wherein said window is pivotally attached with said vehicle body.

3. An arrangement as described in claim 1 wherein said upper window link is biased towards said body.

4. An arrangement as recited in claim 1 wherein said tensioning means is a flexible cable.

5. An arrangement as recited in claim 1 wherein said support link has a horizontal portion in contact with said back window.

6. An arrangement as described in claim 1 wherein said window has side edges and said window has an upper window link and a support link on each side edge of said glass.

7. An arrangement as described in claim 1 wherein said support link makes contact with a horizontal projection of said window.

8. An arrangement for supporting a convertible top nonflexible back window with two side edges having horizontal projections in a raised position in a vehicle body comprising in combination:
   an extended arm fixably attached to said window and pivotally attached to said body;
   means for imparting a downward force for angularly biasing said window away from said body;
   an upper window link pivotally attached to each of the two side edges of said window opposite said body and being angularly biased towards said body;
   a support link pivotally attached to each of said upper window links, said support links also having a horizontal surface in contact with said rear window projections whereby most of said window and said pivotal attachment of said window with said upper window link are on the same side of a line intersecting said surface of said support link in contact with said window and said pivotal attachment of said support link with said upper window link; and
   a flexible cable operatively connecting each of said support links with a portion of said vehicle top forward of said window.

9. A convertible top for a vehicle with a nonflexible back window, said top in combination comprising:
   a cover for covering said top and overlapping said back window;
   a forward linkage for supporting a forward portion of said cover;
   a back link projecting generally upward in a raised position supporting a rearward portion of said cover, said back link being transversely pivotally attached to said vehicle;
   a first link with means of pivotal attachment with said vehicle with an end adjacent to said back link, said first link projecting generally rearward;
   a back window, attached to said first link opposite the end of said first link adjacent to said back link;
   means for angularly biasing said back window away from said first link;
   an upper window link pivotally attached with said back window adjacent an end of said back window opposite the attachment of said back window with said first link;
   a support link pivotally attached with said upper window link opposite the pivotal attachment of said upper window link with said back window, said support link having a point of contact with said window; and
   flexible tension means independent of said angular biasing means operationally connecting said support link with said back link.

10. A convertible top as described in claim 9 wherein said back link is bow shaped extending transversely to both sides of said vehicle.

11. A convertible top as described in claim 9 wherein said first link is crescent shaped extending to both sides of said vehicle.

12. A convertible top as described in claim 11 wherein said first link is the trim stick for said vehicle.

13. A convertible top as described in claim 9 further including a second link pivotally attached to said back link projecting rearwardly from said back link and supporting a part of said cover.

14. A convertible top for a vehicle with a nonflexible back window, said top in combination comprising:
   a cover for covering said top and overlapping said back window;
   a forward linkage for supporting a forward portion of said cover;
   a back bow projecting generally upward in a raised position supporting a rearward portion of said cover, said back bow being transversely pivotally attached to said vehicle;
   a back bow extension pivotally attached with said back bow for supporting a portion of said cover rearward of said back bow;
   a crescent shaped trim stick pivotally attached with said back bow adjacent to said vehicle body;
   a back window including a glass and a frame pivotally attached by an arm to the rearward portion of said trim stick;
   means for imparting a downward force on said frame rearward of the point wherein said frame is pivotally attached with said trim stick;
   an upper window link pivotally attached with said window at an end of said window opposite said trim stick;
   a support link pivotally attached with said upper window link opposite the pivotal attachment of said upper window link with said window, said support link having a point of contact with said window; and
   flexible tension means operatively connecting said support link with said back bow extension.

15. A vehicle top as described in claim 14 further comprising biasing means angularly biasing said upper window link towards said trim stick.

16. A convertible top as described in claim 14 wherein there is an individual window link and support link on both side edges of said window.

17. A convertible top as described in claim 14 wherein said support link has a horizontal surface in contact with said window.

18. A convertible top for a vehicle with a nonflexible back window with two side edges, said top in combination comprising:
- a cover for covering said top and overlapping said back window;
- a forward linkage for supporting a forward portion of said cover;
- a back bow projecting generally upward in a raised position supporting a rearward portion of said cover, said back bow being transversely pivotally attached to said vehicle;
- a back bow extension pivotally attached with said back bow for supporting a portion of said cover rearward of said back bow;
- a crescent shaped trim stick pivotally attached with said back bow adjacent to said vehicle body;
- a back window including a glass and a frame having horizontal projections, pivotally attached by an arm to the rearward portion of said trim stick;
- means for imparting a downward force on said frame rearward of the point wherein said frame is pivotally attached with said trim stick;
- an upper window link pivotally attached with said back window on each side edge of said window biased toward said trim stick at an end of said back window opposite said trim stick;
- a support link pivotally attached with each of said upper window links opposite the pivotal attachment of said upper window link with said back window, said support link having a horizontal surface in contact with said window projections; and
- flexible tension means operatively connecting said support link with said back bow extension.

* * * * *